US005689616A

United States Patent [19]
Li

[11] Patent Number: 5,689,616
[45] Date of Patent: Nov. 18, 1997

[54] AUTOMATIC LANGUAGE IDENTIFICATION/VERIFICATION SYSTEM

[75] Inventor: Kung-Pu Li, LaJolla, Calif.

[73] Assignee: ITT Corporation, New York, N.Y.

[21] Appl. No.: 672,306

[22] Filed: Jun. 28, 1996

Related U.S. Application Data

[63] Continuation of Ser. No. 154,601, Nov. 19, 1993, abandoned.

[51] Int. Cl.$^6$ ........................................................ G01L 9/00
[52] U.S. Cl. ........................................ 395/2.41; 395/2.52
[58] Field of Search ........................................ 395/2.4, 2.41, 395/2.52, 2.63, 2.64, 2.79

[56] References Cited

U.S. PATENT DOCUMENTS

| | | | |
|---|---|---|---|
| 4,181,821 | 1/1980 | Pirz et al. | 395/2.61 |
| 4,665,548 | 5/1987 | Kahn | 381/43 |
| 5,189,727 | 2/1993 | Guerreri | 395/2 |
| 5,349,645 | 9/1994 | Zhao | 395/2.52 |

OTHER PUBLICATIONS

Spanias et al; "Speech Coding & Speech Recognition Technologies; A Review," 1991 IEEE Symp. on Circuits & Systems, 1991, vol. 1, pp. 572–577.

Cole et al. "Language Identification with Neural Networks: A Feasibility Study," Communications, Computers & Signal Processing, 1989, (pp. 525–529).

Muthusamy et al., "A Segment–Based Approach to Automatic Language Identification", ICASSP '91, pp. 353–356.

Savic et al. "An Automatic Language Identification System," ICASSP '91, pp. 817–820.

House, A.S., and Neuberg, E.P., "Toward automatic identification of the language of an utterance. I. Preliminary methodological considerations":, Journal of the Acoustical Society of America, vol. 62. No. 3, pp. 708–713 1977.

Li, K.P., and Edward T.J., "Statistical models for Automatic Language Identification," ICASSP–80, pp. 884–887 1980.

Leonard, G. and Doddington, G.R., "Automatic Classification of Languages", RADS Final Report, RADC–TR–75–264 1975.

Goodman, F.J., Martin, A.F., and Wohlford, R.E., "Improved Automatic Language Identification in Noisy Speech," ICASSP–89, pp. 528–532 1989.

Sugiyama, M., "Automatic Language Recognition Using Acoustic Features," ICASSP–91, pp. 813–816, 1991.

Muthusamy, Y.K. and Cole, R.A., "Automatic Segmentation And Identification of Ten Languages of Telephone Speech," Proceedings of ICSLP, pp. 1007–1010 1992.

A. Higgins, "Speaker Verifier Using Nearest–Neighbor Distance Measure" Patent Application, Ser. No. 07/918,560 1992.

(List continued on next page.)

*Primary Examiner*—Allen R. MacDonald
*Assistant Examiner*—Susan Wieland
*Attorney, Agent, or Firm*—Plevy & Associates

[57] ABSTRACT

A language identification and verification system is described whereby language identification is determined by finding the closest match of a speech utterance to multiple speaker sets. The language identification and verification system is implemented through use of a speaker identification/verification system as a baseline to find a set of well matched speakers in each of a plurality of languages. A comparison of unknown speech to speech features from such well-matched speakers is then made and a language decision is arrived on based on a closest match between the unknown speech features and speech features for such well matched reference speakers in a particular language. To avoid a problem associated with prior-art language identification systems, wherein speech feature are based on short-term spectral features determined at a system frame rate—thereby seriously limiting the resolution and accuracy of such prior-art systems, the invention uses speech features derived from vocalic or syllabic nuclei, from which related phonetic speech features may then be extracted. Detection of such vocalic centers or syllabic nuclei is accomplished using a trained back-error propagation multi-level neural network.

29 Claims, 6 Drawing Sheets

OTHER PUBLICATIONS

Li, K.P., "Neural Network Approach To Assist Markins of Syllabic Nuclie For Multi-Language Database," Abstract J. Acoust. Soc. Am., vol. 92, No. 4, Pt. 2, p.2477, 1992.

Zissman, M.A.,"Automatic Language Identification Using Gaussian Mixture and Hidden Markov Models," ICASSP-93, RAA.8, 1993.

Abe, M., Shikano, K., and Kuwabara, H., "Statistical Analysis of Bilingual Speaker's Speech For Cross-Language Voice Conversion," J. Acoust. Soc. Am., vol. 90, No. 1, pp. 75-82 1991.

Boll, S., Porter, J. and Bahler, L., "Robust Syntax Free Speech Recognition," ICASSP, pp. 179-182 1988.

Llppman ("Pattern Classification Using Neural Networks," IEEE Communications Magazine, vol. 27, Issure 11, Nov. 1989, pp. 47-64 Nov. 1989.

AUTOMATIC LANGUAGE IDENTIFICATION/VERIFICATION SYSTEM

This is a continuation of application Ser. No. 08/154,601, filed on Nov. 19, 1993 now abandoned, entitled AUTOMATIC LANGUAGE IDENTIFICATION/ VERIFICATION SYSTEM.

FIELD OF THE INVENTION

This invention relates to language identification and verification systems in general, and more particularly to such a system where language decisions are made based on a comparison of well-matched reference speakers in each language for which identification is to be made.

BACKGROUND OF THE INVENTION

A language identification/verification system operates on unknown speech to identify the language being spoken, or to verify that the spoken language corresponds to a predetermined language. Such systems find application in both the intelligence and commercial environments, as, for example, in conjunction with machine translation systems for converting speech from one language to another. Moreover, due to the substantial, and increasing, demand made on computational resources by speech identification systems, it will be readily understood that a removal of one of the variables, such as language, can be very desirable. Thus, automatic language identification may also find important application as a part of the "front-end" processing for a speed recognition system. Then the language identification system must operate without any antecedent knowledge of the language for the speech to be identified.

A number of language identification/verification systems are found in the prior art. In 1977, House et al. suggested a statistical model for language identification, with several different approaches to implement an automatic identification system. (House, A. S., and Neuberg, E. P., "Toward Automatic Identification Of Language Of An Utterance. I. Preliminary Methodological Considerations", Journal of the Acoustical Society of America Vol. 62, No. 3, pp. 708–713, 1977). Essentially contemporaneously, Li and Edward reported on several experiments involving automatic segmentation of a speech utterance into six major phonetic segments followed by extraction of a segment occurrence using a statistically model. Such sequential segmental information was used to identify the language spoken. (Li, K. P., and Edward, T. J., "Statistical Models For Automatic Language Identification", ICASSP-80, pp. 884–887, 1980). A few years earlier, Doddington, et al. reported using selected fixed length spectral parameters to form language reference patterns, in identifying the spoken language by searching the frequency of such patterns. (Leonard, G. and Doddington, G. R., "Automatic Classification Of Languages", RADC Final Report, RADC-TR-75-264, 1975). Roughly, a decade later, Goodman et al. described an extraction of speech formants, pitch values, and other short term spectral features, and using them in a statistical approach to identify the spoken language. (Goodman, F. J., Martin, A. F., and Wohlford, R. E., "Improved Automatic Language Identification In Noisy Speech", ICASSP-89, pp. 528–532, 1989). In 1991, Sugiyama described an experimental study that used spectral parameters in short time frames to measure the closeness between references and unknown input to identify the language. (Sugiyama, M., "Automatic Language Recognition Using Acoustic Features", ICASSP-91, pp. 813–816, 1991). Approximately a year later, Muthusamy et al. described the use of an artificial intelligence technique to segment speech into gross phonetic classes to form a statistical model for identifying a language. (Muthusamy, Y. K. and Cole, R. A., "Automatic Segmentation And Identification Of Ten Languages Of Telephone Speech", Proceedings of ICSLP, pp. 1007–1010, 1992). Earlier this year, Zissman described the use of a statistical model, specifically a Hidden Markov Model, or HMM, to represent a language model and to process speech spectral statistics at the frame rate for identifying language. (Zissman, M. A., "Automatic Language Identification Using Gaussian Mixture And Hidden Markov Models", ICASSP-93, RAA.8, Minneapolis, Minn., April, 1993). As will be known to those skilled in the art of the invention, all of these efforts at language identification have shown only moderate success.

Unlike many speech identification systems, a language recognition system must operate from the premise that the speaker is unknown, and that the text to be evaluated is unconstrained. With this premise, automatic language identification becomes a challenging problem. In addition to the non-ideal operating environment, variations due to duration of speech, channel characteristics, and background noise make processing even more difficult. A major obstacle to the realization of an acceptable level of accuracy from prior-art language identifiers results from the wide variation in speaker characteristics found in those spectral features most often used by such prior-art language recognition systems. All of the prior-art systems described above are based on the use of pooled speech samples for multiple speakers, cataloged by language, to form a speaker-independent model for that language. Moreover, as will be known, all prior-art speech recognition, speaker identification, and language identification systems operate generally within the same set of parameters: namely, short term spectral representation.

Due to large variations between speakers at the short term spectral level, performance of the language recognition system is likely to be influenced by individual speaker characteristics. Thus, a general model for a language covers only the common physical features among all of the speakers in the training data. This will result in a large overlap of features and spectral characteristics among the different languages. A recent study shows that speaker differences within a language are much greater than the differences between two different languages for a single bilingual speaker. (Abe, M., Shikano, K., and Kuwabara, H., "Statistical Analysis of Bilingual Speaker's Speech For Cross-Language Voice Conversion", JASA, Vol. 90, No. 1, pp. 76–82, 1991). Therefore, confusion between language will be very large, and the likelihood of error in a language recognition system will be substantial if the input features for a language recognition system are limited to the acoustic phonetic features.

Another limitation of prior an systems is that such systems have generally used either short term spectral features at a 10–20 msec frame rate, or an automatic speech recognition technique to segment a speech sample into discrete units, such as phonemic or gross phonetic feature classes. As will be known, the phonetic technique does not bear any linguistic structure information, which information contains most of the significant distinctions between major languages—such as syllabic, word's, and grammatic structures. Similarly, with current technology, segmentation of speech in speech recognition systems does not provide an identification of speech segments with an acceptable level of accuracy. The classification errors may propagate into the statistical modeling and thereby degrade the matching processes.

Accordingly, it is an object of this invention to provide a language identification/verification system which minimizes error due to differences in speakers within a language. A further object of the invention is a language identification/ verification system which detects vocalic or syllabic nuclei, and then extracts related phonetic features to represent the syllabic structure at the vocalic centers or syllabic nuclei. Among the applications of such an automatic language identification/verification system are the following:

(1) such a system can detect the language of incoming speech and direct such speech to an appropriate receiver trained in the target language—e.g., a telephone caller could be automatically connected to an operator fluent in the language of the caller without having to deal with an interface in a language foreign to the caller;

(2) such a system would find ready application as a "front end" for an automatic speech recognition system such as an automatic transcriber or translator, which systems are often designed to be language-specific.

(3) such a language identification system will also be useful to a decision as to which phonetic features a speech recognition system might need as its input—e.g., Chinese, being a tonal language, requires the fundamental frequency (pitch) as a basic and necessary phonemic feature for speech recognition, whereas English does not have such a requirement.

SUMMARY OF THE INVENTION

A Language Identification/Verification System is disclosed comprising a means for processing spoken text into frames of speech and a means for detecting and extracting speech features from the frames of speech, which in combination operate to identify phonetic speech elements, matching means for comparing the phonetic speech features with stored referenced phonetic speech features and establishing a match score for the comparison proportional to a degree of similarity between the phonetic speech features and the stored reference phonetic speech features, and decision means for identifying input speech to the system as corresponding to one of a plurality of languages, whereby the language identification for the input speech is established on the basis of a comparison of the match score with at least one predetermined threshold score associated with one of the plurality of languages.

DETAILED DESCRIPTION OF THE INVENTION

Figure 1:
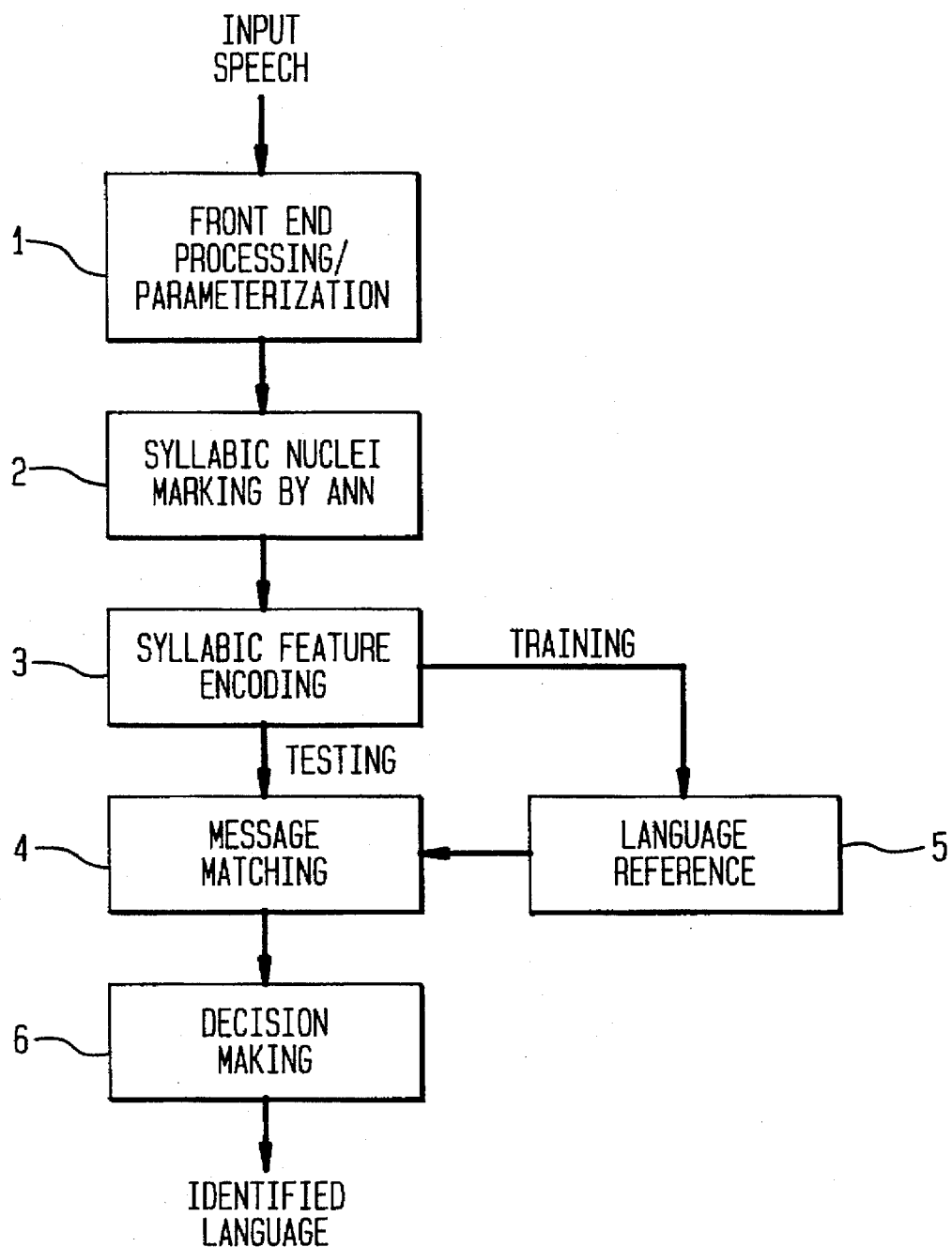
FIG. 1 is a diagram of the major components of the system of the invention.

The overall structure enabling operation of the invention is shown in the diagram of FIG. 1. In that figure, the first element, Front-end Processing/Parameterization 1, operates on the input speech to reduce variations in speech signals due to environmental factors—e.g., differences in channels, microphone and amplitude settings. Such preprocessing/ parameterization functions are known to those skilled in the art of the invention, and any number of prior-art embodiments of such functions may be applied to this element of the invention. The remaining functional elements, which are the core functions of the invention, will be described in detail in following sections. Briefly, however, the elements Syllabic Nuclei Marking by ANN 2 and Syllabic Feature Encoding 3 operate to extract language-specific features at a syllabic level from the Front-end Processing/ Parameterization output. The Message Matching 4 element operates in relation to Language Reference 5 to minimize differences among speakers. The Decision Making 7 element operates on information developed by the preceding elements to make a determination of the language of the input speech. It is also noted that the invention can be implemented through the use of three different functions for language identification, which functions can be used independently or in conjunction with each other. The first such function is the Nearest Neighbor analysis model, which finds the best speaker within a language in order to decide what language is being used. The second function is an Artificial Neural Network analysis model, or ANN. The third function is a syllabic-based Hidden Markov Model or HMM, which is a speaker-pooled or a speaker-independent approach to represent a language. Although each of these language identification functions will be characterized by particular advantages, all three are competitive in performance and accuracy.

Hereafter, the core functions of the invention are described in detail.

A. Front-end Processing to Extract Spectral Parameters

In any language identification application, it must be assumed that the reference and testing utterances represent different speakers, different channels and different environments. The front-end processing operates to reduce speech variations resulting from such differences and/or to achieve a workable normalization of such input variations. Initially, input speech is sampled and converted to parameters usable by the processing steps of such a system. In a preferred embodiment of the invention, such parameterization is established through operation on the input signals by fourteen bandpass filters covering the frequency range from 300 hz to 3300 hz, the output of such bandpass filters being sampled every 20 msc. and converted to Olano Parameters—i.e., rms normalized fourth root of the amplitude within each band, such as was described in Boll, S., Porter, J. and Bahlet, L., "Robust Syntax Free Speech Recognition", ICASSP, pp. 179–182, April, 1988.

To normalize, and therefore reduce the effect of variation in input signals, due to text and channel differences among the reference and testing utterances, there are a variety of normalization processes that may be applied to the parameterization outputs. Two such normalization processes commonly utilized are: blind deconvolution and z-score normalization. As will be known, the blind deconvolution process is described by the equation:

$$Y_t = X_t * \frac{\overline{X}}{X_t}$$

Likewise, z-normalization, which is a process of mean removal and variance normalization is described by the equation:

$$Y_t = \frac{X_t - \overline{X}}{SD_X}$$

These normalization and parameterization processes are well known to those skilled in art of speech identification systems and will not be further discussed here.

B. Vocalic Center and/or Syllabic Nuclei Marking

As previously discussed, prior art language identification systems have commonly used short term spectrum as the basic feature space, with generally unsatisfactory results. This invention is directed to the extraction of language features at the segmental level. To avoid the language dependent phonetic segmentation process, with its obvious limitation for a language recognition system, a process has been developed to mark the anchor points of syllable nuclei, and thereby extract the spectral features for the syllabic structure without any reference to phonetic events. The essential process of this aspect of the invention is, first, to develop a learning process for detecting and marking those anchor points corresponding to syllabic nuclei, or vocalic center peaks, and second, to utilize those markers for extracting and encoding phonetic sequential events near the syllabic nuclei. A sample size is chosen to correspond to the number of phonetic events found, and those sample contents represent the phonetic spectral structure near the syllabic nuclei.

Figure 2:
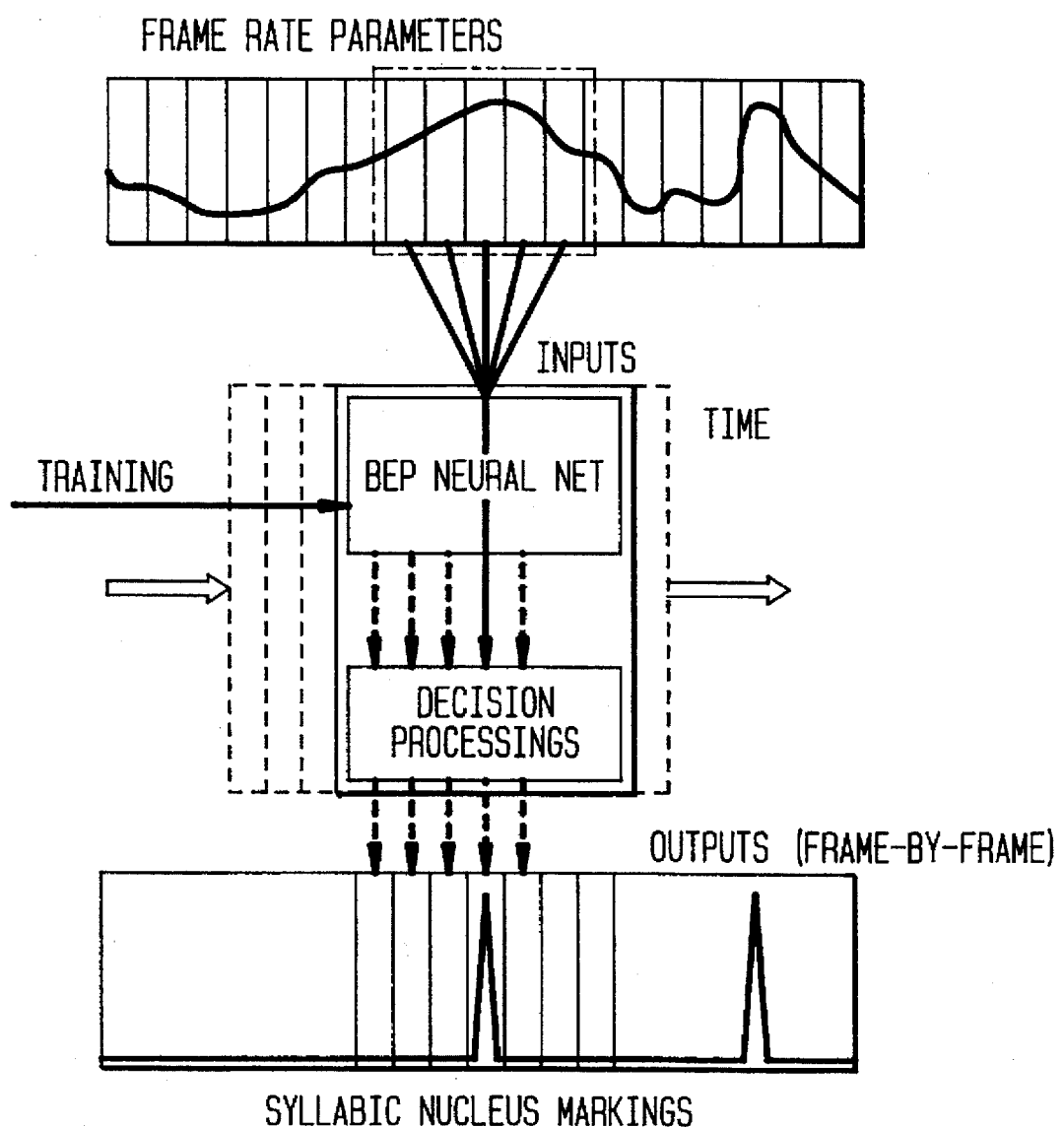
FIG. 2 depicts operation of syllabic nuclei marking by an artificial neural network.

FIG. 2 depicts, in organizational form, an automatic marking function for detecting and marking the vocalic centers and syllabic nuclei for all languages. Implementation of this function is essentially based on the operation of a trained Back Error Propagation Multi-Layer Perceptron (BEP-MLP) neural network. Training of this network, is accomplished with a multiple language database using hand-marked syllabic nuclei as the teaching data. In an experimental embodiment, 30 seconds of speech for each of 5 different languages was used.

Figure 3:
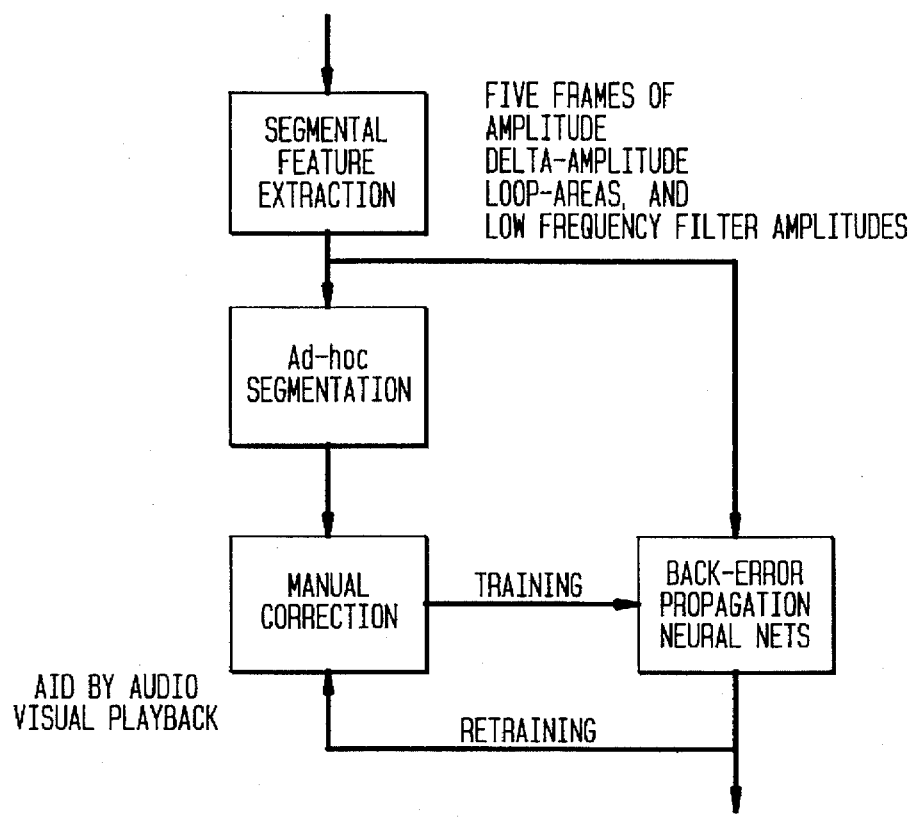
FIG. 3 represents diagrammatically the method whereby the artificial neural network of FIG. 2 is trained.

The training of the BEP-MLP artificial neural network is depicted in FIG. 3, and includes the following steps:

i. The speech data is marked to detect the syllabic nuclei of the sample multi-language speech data—30 seconds of speech data for each of five languages in an experimental embodiment. Such marking may be entirely by hand, or by using a known methodology for automatically detecting such syllabic nuclei, followed by a manual review of the results from such an automated method to correct erroneous markings from that automatic method.

ii. A BEP-MLP neural network is trained on the marked syllabic nuclei for the sample speech data. In a realized embodiment of the invention, inputs to the neural network were five frames of amplitude, their time derivatives, left and right loop areas, and the five lowest frequency outputs. Using the described sample, a total of forty-five values would be input to the neural network. In the described embodiment, the teaching function for the network consisted of a "1" for the target segment and a "0" for the non-target segment. The network uses only one hidden level, with one output to indicate "marking". Simple decision logic is implemented to separate the neural network output in to frame-by-frame markings of syllabic nuclei detection.

iii. After the training process, the neural network is employed to relabel the marked speech samples as a check for the learning efficiency of the network. In the described embodiment, the inconsistency between hand-corrected markings and that of the trained neural network was less than 3%, a result which is viewed as being essentially equal to the inherent error in the hand-marking process.

iv. The procedure of labeling, correction, training, and re-labeling is then repeated on larger and larger speech samples until a fully-trained neural network is realized. This network is then used without further modification to label and mark other databases of reference speech.

From the results achieved in the described embodiment of the BEP-MLP neural network, the following conclusions are drawn:

(a) The neural network outputs are consistently, and closely matched to the hand-marked data.

(b) In the training of the network, manual markings are needed only for correction, which significantly increases marking speed.

(c) Marking of unfamiliar languages can easily be accomplished.

(d) The neural network markings can be implemented as an on-the-fly, front-end process to automatically locate syllabic nuclei without significant delay.

In summary, input parameters to such a BEP-MLP neural network cover multiple frames of speech amplitudes and time derivatives, along with filter outputs and vocalic-center related features. Such a neural network has a decision process to provide a binary decision for each individual frame of speech data. Thus, if a syllabic nucleus is detected, the output of the network is binary "1"; otherwise the output will be a "0".

C. Syllabic Feature Extraction and Encoding

Figure 4:
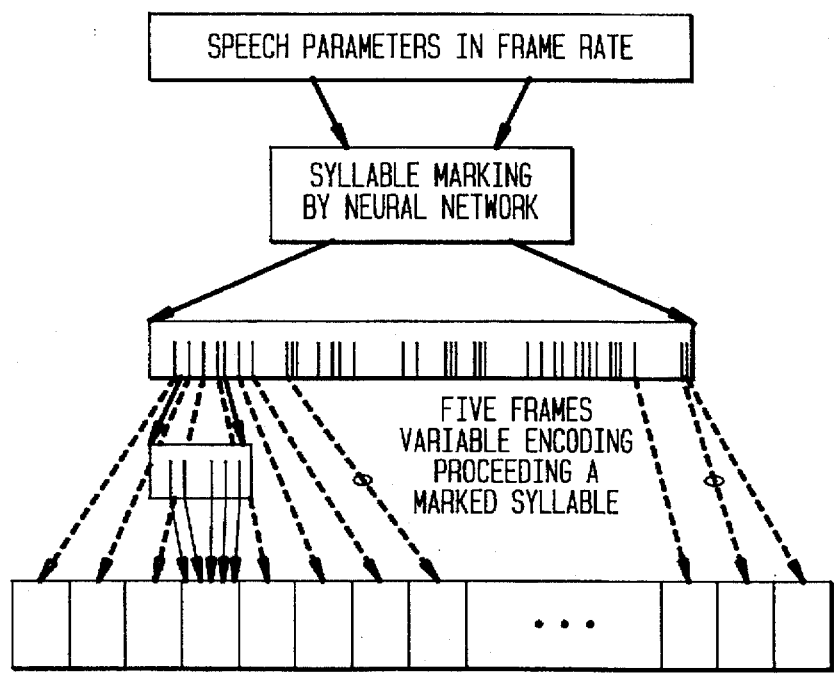
FIG. 4 depicts operation of syllabic feature encoding according to the invention.

Syllabic Feature Encoding, 3 of FIG. 1, is illustrated in greater detail in FIG. 4, which shows the flow diagram of encoding for a fixed number of speech frames prior to the syllabic nuclei marking (backwards in time). As will be seen in that figure, feature extraction, which forms the basis for the subsequent feature matching step, is done by encoding a number of frames in sequence near the marks made during the marking process described above.

This element of the invention extracts the acoustic phonetic features to represent the syllabic characteristics of a language. The detected syllabic nuclei are used as anchor points, and the process extracts the phonetic events surrounding each such syllabic nucleus.

In a realized embodiment of the invention, the number of frames needed to encode syllabic features is in a range from four to six. There are at least two well-known encoding techniques which may be used for encoding of the syllabic features: (1) variable frame encoding and (2) arc-length encoding. Both such encoding techniques have been found to work with the invention, and others will be apparent to those skilled in the art.

With variable frame encoding, a determination that the distance to a frame under consideration from an adjacent frame does not exceed a specific threshold distance causes the frame to be discarded, and the next adjacent frame to thus be considered. The process continues until a specified number of frames have been extracted. For arc-length encoding, the arc-length is accumulated from frame to frame. When a length is achieved which is larger than a predetermined threshold length, the frame under consideration at that time is encoded. These two encoding techniques depend on acoustic changes in time, and are minimally effected by the speaking rate. Frames so encoded form a single feature vector representing the sequential phonetic event at the on-set of a syllabic nucleus.

As will be understood by those skilled in the art of the invention, the syllabic on-set is a spectral representation of the sequential events in phonetic changes before a syllabic nucleus. The essential advantage of this methodology is a reduction in feature variation due to different speaking rates in the input speech. The methodology additionally incorporates a selection procedure to ensure that the frames selected for encoding are not chosen predominantly from "silent" frames, such as would occur in a short syllable—e.g., "the" and "a"—at the beginning of a sentence.

D. The Feature Matching Process

The next step in the operation of the language identification system of the invention, the feature matching process, 4 of FIG. 1, will, in a preferred embodiment be implemented using a Nearest-Neighbor determination as described in the next section. However, alternate embodiments of the invention may incorporate (1) a multi-level artificial neural network using back-error propagation or (2) a Hidden Markov Model, operating at the syllabic structure, for performing some or all of the feature matching functions. Such alternative embodiments will also be described in following sections.

D1. Using Nearest-Neighbor Approach For Finding Best Matched Speaker

As explained above, the base-line system for the feature matching process of the invention uses the Nearest-Neighbor process for determining a match between input speech features and reference speech features. This process, which represents a non-parametric approach for speaker identification and uses the average Nearest-Neighbor distance between speech features is described in a pending patent application, Ser. No. 07/918,560, entitled SPEAKER VERIFIER USING NEAREST-NEIGHBOR DISTANCE MEASURE, filed by A. Higgins and assigned to FIT Corporation, the same assignee as the for the present application. A major advantage for the Nearest-Neighbor algorithm described in the referenced application is that training samples from each speaker can be limited, since there is no statistical estimation; all samples form their own local distribution without any estimation. The difference measure becomes a matching of distributions between a reference and an unknown. With subsequent normalization of environments—which includes variations of length, content and speaker biases in those measures, the performance of matching a target speaker becomes excellent.

An essential difference in the methodology used here and that of the referenced application, however, is found in the input data to the matching process. Instead of evaluating speech parameters at a frame rate, as is the case in the referenced application, the input sample used by this invention is obtained through the syllabic encoding of multiple frames. Thus, the matching process is accomplished by finding the average score of the nearest-neighbor distance for whole utterances for each reference speaker. Another significant difference in the process of the invention from that of the referenced patent application is that the system of the invention also groups together all speakers who speak the same language. Additionally, as described more fully below, the system of the invention includes an additional scoring step for identifying the language spoken.

D2. Two-Level Artificial Neural Network For Language Identification

Figure 5A:
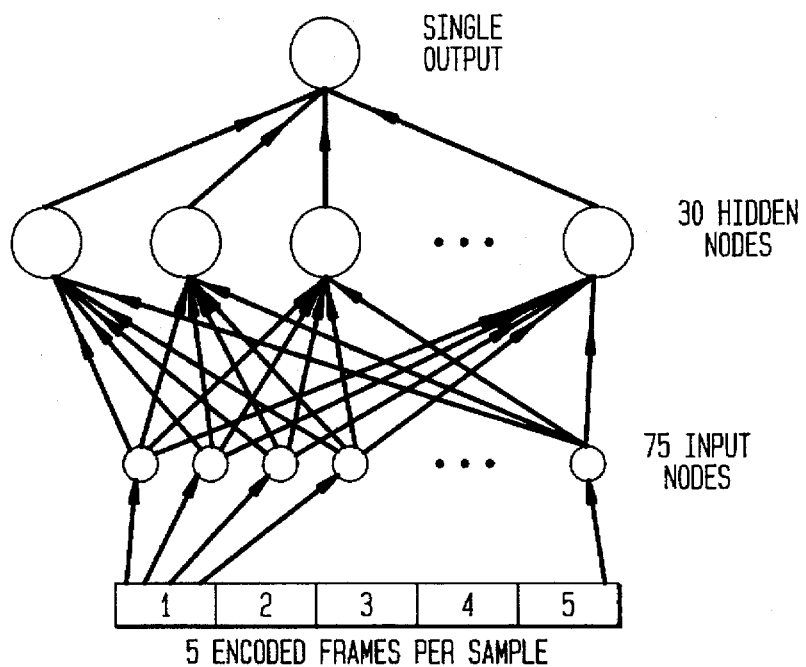
FIG. 5 shows the flow diagram for a two level artificial neural network for language identification, including (a) the syllabic level neural network, and (b) the second level neural network with multiple syllabic structure.
Figure 5B:
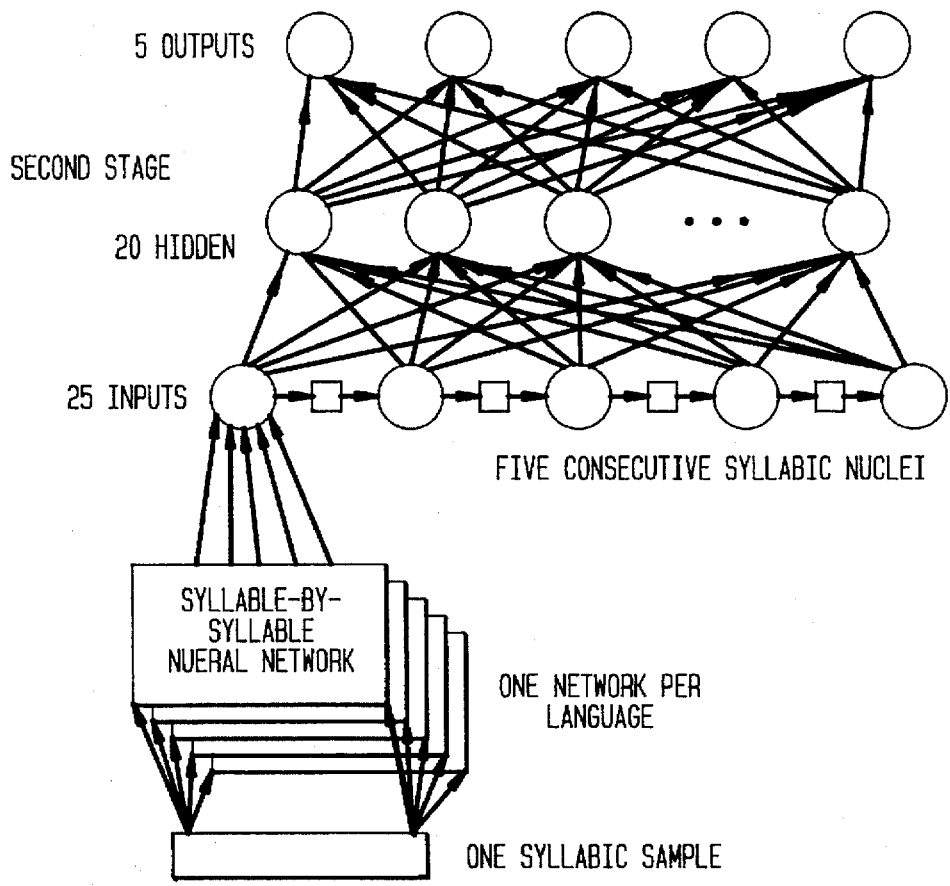

In an alternative embodiment, a two-level artificial neural network may be used to replace the nearest neighbor technique in the feature matching process. Such a two-level artificial network is illustrated in FIG. 5. As can be seen from the figure, the two-level artificial network involves two stages of training. The first level BEP-MLP neural network is trained to discriminate one language from the remaining languages at the single syllable level. Therefore, one BEP-MLP neural network will be used for each language to be tested. At a second level, another BEP-MLP neural network combines all of the outputs from the first level BEP-MLP neural networks, and accumulates multiple syllables. The second level, BEP-MLP neural network then further separates languages by their sequential patterns. In this embodiment, each first level neural network can learn to separate a target language when multiple speaker data are pooled together. As will thus be understood, such a neural network can learn to separate all target languages when multiple speakers' data are pooled together.

D3. Syllabic Hidden Markov Model For Language Identification

Figure 6A:
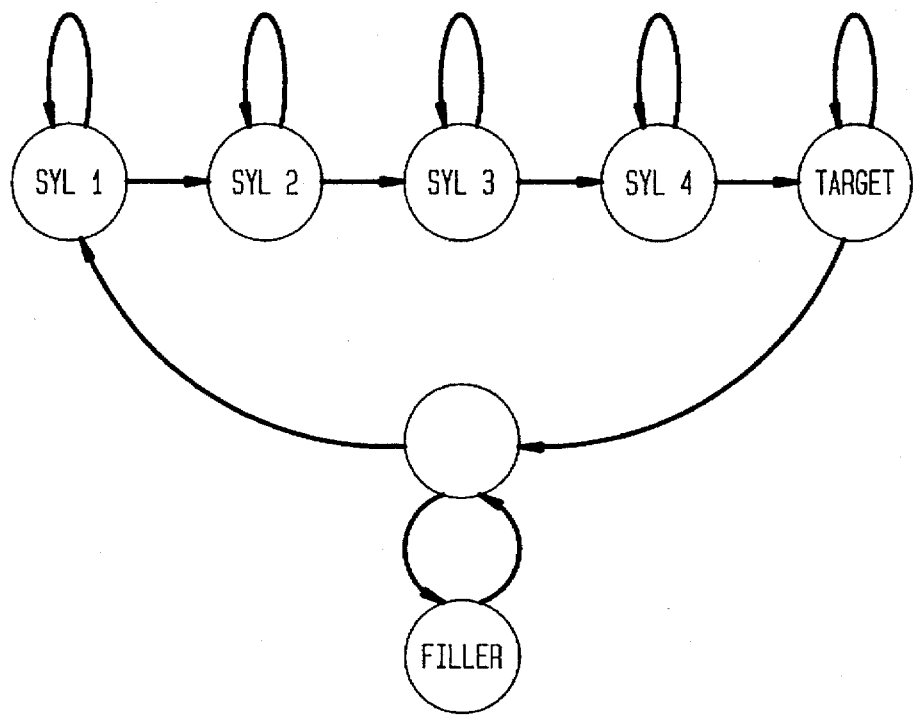
FIG. 6 shows the Hidden Markov Model for syllabic extraction and language matching according to the invention, including (a) the syllabic modeling at each syllabic nuclei, and (b) the matching of an HMM to test the utterance to obtain matching probability for a language.
Figure 6B:
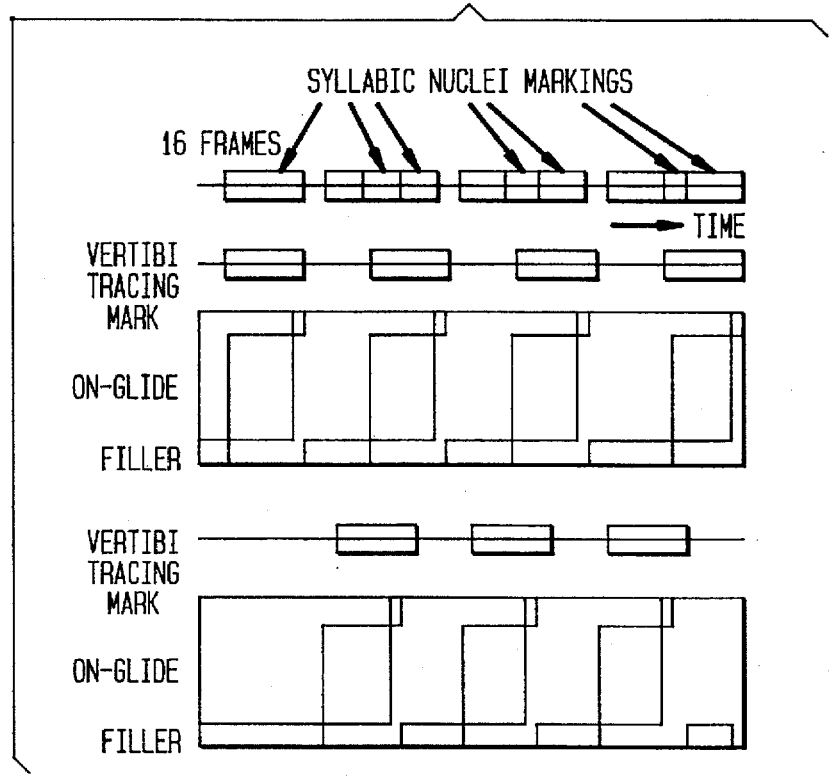

In another embodiment, an HMM may be used as an alternative to both the syllabic extraction and the matching processes of the invention by establishing separate such models to represent each individual language to be evaluated. Operation of such an HMM is depicted in FIG. 6. In this embodiment, the HMM is trained as an underlying statistical model of a language's syllabic structure. The model is forced to use syllabic markings as the anchor point of the fixed state of the model to learn the statistical characteristics of variable duration spectral strings related to the anchor point.

The basic concept of this process is in the use of a finite state Markov chain as a statistical model to extract the probability of the spectral pattern, and to match language characteristics. The process not only observes each syllable, but also uses the Viterbi tracking technique—as described in Forney, G. D., "Viterbi Algorithm", Proc. of IEEE, Vol 61 (3) March 1973, pp. 268–278, to string together a multiple syllable sequence into the best possible form for describing the testing utterances with the language structure trained in the HMM. Therefore, the overall encoding score for matching the testing utterance toward the language model is used for language identification. This process will eliminate use of a fixed number of frames in the syllabic feature extraction, as described above in the discussion of syllabic feature extractions, and instead covers a fixed time span. This HMM embodiment will however require a very large set of speech samples in order to train the HMM model to be speaker independent for the language.

E. Decision Making

To effectively use the spectral features in a speech identification system, it is necessary to quantify the operating environment. For speaker identification, the target speaker should be included in the reference set, and, accordingly, multiple recording sessions for each speaker are required. For language identification, on the other hand, the speaker of the test speech would normally not be included among the reference speakers.

As previously described, it has been established that speaker differences between a pair of speakers are much greater than language differences obtained from a single bilingual speaker. From this, it follows that there exists a similarity between speaker identification and language identification, and that the two closest speakers identified by a speaker identification system will have similar speaking characteristics and/or a similar language structure. Thus, reducing the differences between two speakers to find the remaining language differences becomes an essential process in dealing with such speaker variations.

If the two closest speakers are speaking the same language, the differences will be smaller than if they are speaking different languages. While speaker and language difference are difficult to separate, they can be distinguished with proper decomposition. As is well known, a speaker identification system can find matched utterances for the same speaker. Thus, language identification can be determined by finding the best matching speaker for a known language.

Figure 7:
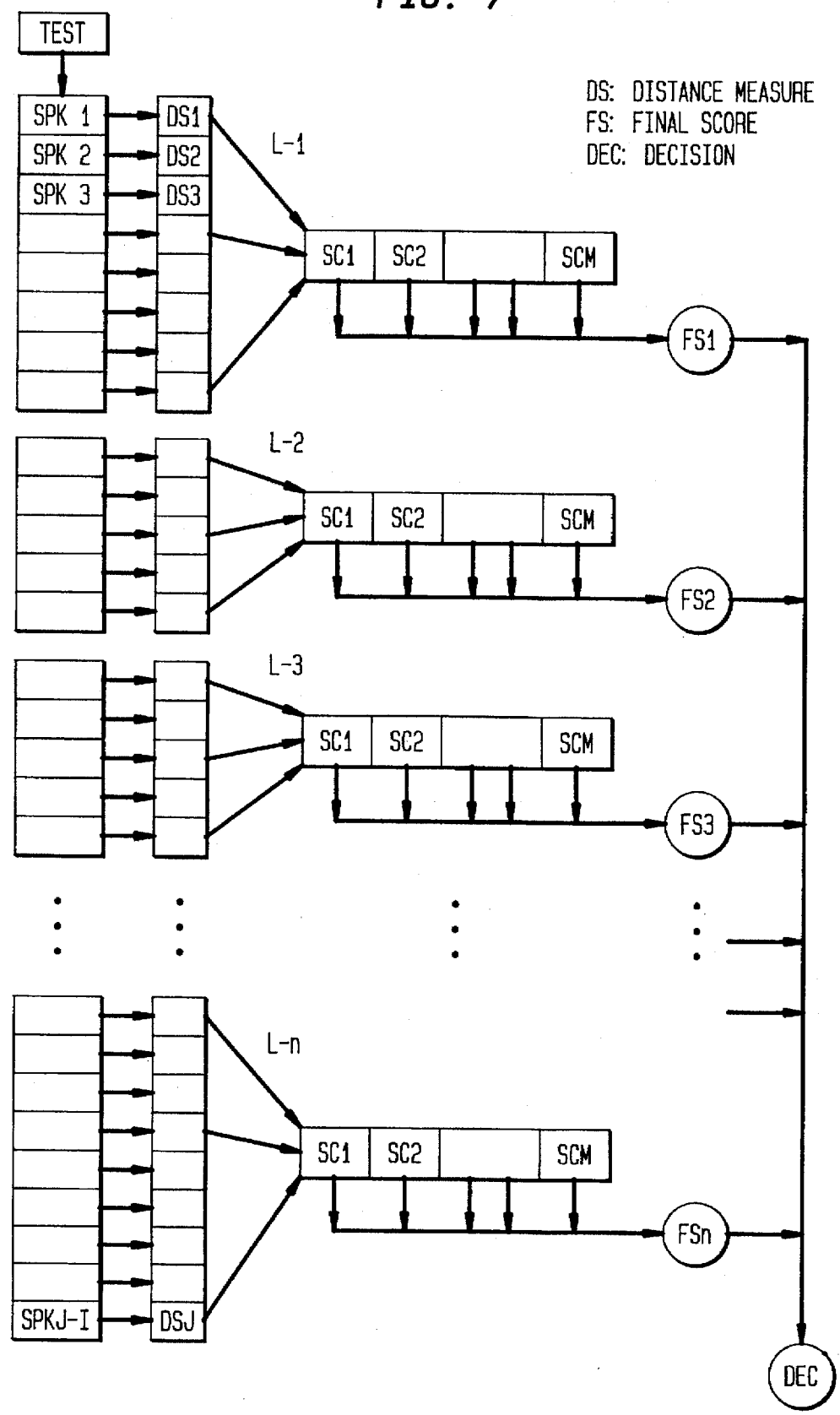
FIG. 7 depicts the matching process and the language decision process according to the invention.

FIG. 7 depicts a speaker identification system according to the invention which operates so as to use these principles to advantage. As can be seen in that figure, all speaker models from the same language are grouped together. After an appropriate normalization of the message distances for comparable scores, each such language group will provide a small set of best-speakers against which an unknown utterance can be compared. From this, a score corresponding to the comparison as to each language is obtained. A minimum score is defined as the minimum message difference measure between the test sample and all reference speakers in each language as determined in such a comparison. An average score is defined as the average of all message difference scores between the test utterance and all speakers in a language. Both minimum and average scores in each language may be used in the decision process of the invention for identifying the language of the tested utterance.

In the operation of the invention, the matching process estimates the average minimum distance (or distortion) from the test sample to the reference samples, or vice versa. In an ideal case, one would only extract language differences for language identification and, similarly, only extract speaker differences for speaker identification. Realistically, however, these two differences (i.e., language and speaker) cannot be completely separated in the front-end processing of a language identification system, especially given that the input feature set inherently consists of both speaker and language characteristics. Therefore, speaker variation in language identification system must be addressed in the decision process.

To achieve perfect speaker identification without any language features, language identification in such a system would approach random chance. Similarly, a perfect language identification system cannot distinguish speakers within the same language or cross over to different languages. Thus, any speaker of a language may be the reference speaker for that language. In order to obtain the best (i.e., nearest neighbor) matching as a message difference measure, a perfect language identification system must be completely independent of speaker variations within a language. Every match and measure from the test utterance to the different speaker references within a target language must always be the best (i.e., minimum) compared to any speakers from different languages. Therefore, the average score for any group of speakers should also perform well under such conditions. The differences between minimum scores and average scores for language identification can also indicate the degree of change for language distinction among speaker differences. It will of course be recognized that under realistic conditions, the operating environment for a language identification system will be located between those two extremes. Thus, there will always be some speaker and language differences in any set of features.

The decision process of the invention essentially comprises an evaluation of scores from the matching process against predetermined threshold levels. As indicated above, a best, or minimum, score is established for a matched speaker for each language group. Similarly, the average score for a language represents an average of speaker matching distances within that language. It should be understood that, if the database for the invention includes n languages, then n minimum scores and n average scores will be usable, either separately or in combination, for language identification or verification.

The basic decisional process of the invention is to use the scores from the matching process as the difference between two messages, either from the same or different languages. If the two messages are in the same language, the score will be smaller than if the messages are from two different languages.

In the ideal circumstance of the input speech features being completely (or at least essentially) free from speaker differences, the average score would be expected to provide the best value for making a language decision. In the more usual case of the input features containing both speaker and language characteristics, comparison with the minimum score will produce more efficacious result, due to use of the best-matched speaker in each language as the threshold score. For example, if speech is recorded with high quality recording equipment and with readings made by only same-gender speakers, the minimum score will be expected to outperform the average score. On the other hand, if the speech is recorded from telephone lines (i.e., representing narrow bandwidth and line noise) and the speech is spontaneous monologue from both males and females, minimum scores will be expected to perform worse than average scores. In such a non-ideal environment, an average of a small portion (i.e., one-fourth to one-third) of best scores with average scores within each language will usually provide the best performance.

As will be appreciated, the system of the invention is flexible in its scoring methodology and the learning process can therefore be based on different databases to obtain optimum results by testing both types of scoring or combined scores.

It will thus be seen that the invention overcomes the problem of short-term acoustical spectrum lacking language structure information, by detecting vocalic or syllabic nuclei and then extracting related phonetic features that are at the vocalic centers or syllabic nuclei. The system then uses such features to represent the sequential acoustic and phonetic events at the centers or nuclei. A significant improvement in language identification is thus realized through the use of syllabic features.

Accordingly, a minimal learning or reliable recognition process may be used to obtain basic acoustical features at the syllabic level. Such a combination of marking or extraction yields sufficient language differences for reliable language identification, without the difficulties associated with other segmental approaches.

A further substantial improvement over prior-art systems resides in the invention's utilization of a known speaker identification/verification methodology as a base line system to identify a set of well-matched speakers in each language. The system of the invention then compares the "test" speech to such well matched speakers in each language and then determines the language of the test speech. As will be understood, the matching process minimizes the effects of speaker deviations among different speakers either within or between languages. Thus, during such a comparison, the system minimizes speech differences due two different speakers between the "test" speech and the reference data.

Several scoring techniques are also implemented in the invention to minimize the effect of remaining speaker variations on language identification reliability.

Herein, a novel language identification system has been described with operates by finding the closest match of a test utterance to multiple speaker sets. Because the language identification system operates on spectral features at the syllabic level of speech, rather than at the frame level, this language identification system substantially exceeds the level of reliability achieved by prior-art language identification system. In experiments conducted by the inventor, the system of the invention typically achieved an improvement in decisional accuracy on the order of 15 to 20 percentage points relative to prior art language identification systems.

Although the present embodiment of the invention has been described in detail, it should be understood that various changes, alterations and substitutions can be made therein without departing from the spirit and scope of the invention as defined by the appended claims.

What is claimed is:

1. A Language Verification System comprising:
   means for processing spoken text entered into the system whereby spoken text is converted into frames of speech, and wherein variations in input speech signals extrinsic to those introduced by a speaker's vocal tract are attenuated;
   means for detecting and extracting phonetic speech features that are syllabic nuclei, from said frames of speech;
   matching means for comparing said phonetic speech features with stored reference phonetic speech features and establishing a match score for said comparison proportional to degree of similarity between said phonetic speech features and said stored reference phonetic speech features; and,
   decision means for identifying said input speech as corresponding to one of a plurality of languages, whereby said language identification for said input speech is established on the basis of a comparison of said match score with at least one predetermined threshold score associated with at least one of said plurality of languages, said decision means encompasses a scoring methodology wherein multiple matched speakers within sand across a multiplicity of languages are identified as to a language spoken based on a score selected from the group consisting of a minimum score, an average score and a combination minimum-average score.

2. The Language Verification system of claim 1, wherein said detection of syllabic nuclei occurs through processing said input speech by a trained back error propagation multi-layer neural network.

3. The Language Verification System of claim 1, wherein feature information respecting said speech input is realized by encoding a plurality of frames of said input speech from a sequence of said frames proximate to the syllabic nuclei.

4. The Language Verification System of claim 1, wherein said matching means is implemented as a determination of nearest-neighbor Euclidian distances between said phonetic speech features and said stored reference phonetic speech features.

5. The Language Verification System of claim 1, wherein said matching means is implemented in a multi-level artificial neural network using back error propagation.

6. The Language Verification System of claim 5, wherein said multi-level artificial neural network operates at a first level to discriminate each of a plurality of languages at a single syllable level and at a second level to further separate said plurality of languages by sequential patterns.

7. The Language Verification System of claim 5, wherein said back-error propagation neural network is implemented through a multiplicity of levels for a language discrimination, thereby causing said language verification system to be speaker independent.

8. The Language Verification System of claim 1, wherein said means for extracting phonetic speech features and said matching means, in combination, are implemented in a Hidden Markov Model wherein a separate model is defined for each of a plurality of languages.

9. The Language Verification System of claim 8, wherein said Hidden Markov Model is based on syllabic speech features and structure, and wherein said model is speaker independent.

10. In a Language Verification System comprising a means for processing spoken text into frames of speech, a means for detecting and extracting speech features from said frames of speech, matching means for comparing said speech features with stored references speech features and establishing a matched score for said comparison proportional to a degree similarity between said speech features and said stored reference speech features, and decision means for identifying input speech to said system as corresponding to one of a plurality of languages, the improvement therewith comprising:
    means operable with said means for detecting and extracting speech features that are syllabic nuclei, to identify phonetic speech;
    means operable with said matching means to establish a match score proportional to a degree of similarity between the phonetic speech features and stored reference phonetic speech features; and,
    means operable with said decision means whereby said language identification for said input speech is established on the basis of a comparison of said matched scores with at least one predetermined threshold score associated with one of said plurality of languages, said means operable with said decision means encompasses a scoring methodology wherein multiple matched speakers within and across a multiplicity of languages are identified as to a language spoken based on a score selected from the group consisting of a minimum score, an average score and a combination minimum-average score.

11. The Language Verification System of claim 3, wherein said detection of syllabic nuclei occurs through processing said input speech by a trained back error propagation multi-level neural network.

12. The Language Verification System of claim 3, wherein feature information respecting said input speech is realized by encoding a plurality of frames of said input speech from a sequence of said frames proximate to said syllabic nuclei.

13. The Language Verification System of claim 10, wherein said matching means is implemented as a determination of nearest-neighbor Euclidian distances between said phonetic speech features and said stored reference phonetic speech features.

14. The Language Verification System of claim 10, wherein said matching means is implemented in a multi-level artificial neural network using back error propagation.

15. The Language Verification System of claim 14, wherein said multi-level artificial neural network operates at a first level to discriminate each of a plurality of languages at a single syllable level and at a second level to further separate said plurality of languages by sequential patterns.

16. The Language Verification System of claim 14, wherein said back-error propagation neural network is implemented through a multiplicity of levels for a language discrimination, thereby causing said language verification system to be speaker independent.

17. The Language Verification System of claim 10, wherein said means for extracting phonetic speech features and said matching means, in combination, are implemented in a Hidden Markov Model wherein a separate model is defined for each of a plurality of languages.

18. The Language Verification System of claim 17, wherein said Hidden Markov Model is based on syllabic speech features and structure, and wherein said model is speaker independent.

19. The Language Verification System of claim 10, wherein said decision means encompasses a scoring methodology wherein multiple matched speakers within and across a multiplicity of languages are identified as to a language spoken based on a minimum score, an average score or a combination thereof.

20. A method for automatically identifying the language of a speaker as corresponding to one of a plurality of languages, including the steps of:

processing spoken text, whereby said spoken text is converted into frames of speech and wherein variations in input speech signals extrinsic to those introduced by a speaker's vocal tract are attenuated;

detecting and extracting phonetic features that are syllabic nuclei from said frames of input speech;

comparing said phonetic speech features with stored reference phonetic speech features and establishing a match score for said comparison proportional to a degree of similarity between said phonetic speech features and said stored references phonetic speech features; and identifying said input speech as corresponding to one of a plurality of languages, whereby said language identification for said input speech is established on the basis of a comparison of said match score with at least one predetermined threshold score associated with at least one of said plurality of languages, wherein said match score and said at least one predetermined threshold score are both of a type selected from the group consisting of a minimum score, an average score and a combination minimum-average score.

21. The automatic language identification method of claim 2, wherein the detection of syllabic nuclei occurs through processing said input speech by a trained back error propagation multi-level neural network.

22. The automatic language identification method of claim 2, wherein feature information respecting said input speech is realized by encoding a plurality of frames of said input speech from a sequence of said frames proximate to said syllabic nuclei.

23. The automatic language identification method of claim 20, wherein said comparing step is implemented as a determination of nearest-neighbor Euclidian distances between said phonetic speech features and said stored reference phonetic speech features.

24. The automatic language identification method of claim 20, wherein said comparing step is implemented in a multi-level artificial neural network using back error propagation.

25. The automatic language identification method of claim 24, wherein said multi-level artificial neural network operates at a first level to discriminate each of a plurality of languages at a single syllable level and at a second level to further separate said plurality of languages by sequential patterns.

26. The automatic language identification method of claim 24, wherein said syllabic-delayed back-error propagation neural network is implemented through a multiplicity of levels for a language discrimination, thereby causing said language verification system to be speaker independent.

27. The automatic language identification method of claim 20, wherein the step of extracting phonetic speech features and the comparing step, in combination, are implemented in a Hidden Markov Model wherein a separate model is defined for each of a plurality of languages.

28. The automatic language identification method of claim 27, wherein said Hidden Markov Model is based on syllabic speech features and structure, and wherein said model is speaker independent.

29. The automatic language identification method of claim 20, wherein said identifying step encompasses a scoring methodology wherein multiple matched speakers within and across a multiplicity of languages are identified as to a language spoken based on a minimum score, an average score or a combination thereof.

* * * * *